US006276473B1

(12) United States Patent
Zur Megede

(10) Patent No.: US 6,276,473 B1
(45) Date of Patent: Aug. 21, 2001

(54) HYBRID VEHICLE HAVING A AN INTERNAL-COMBUSTION ENGINE, A FUEL CELL SYSTEM AND AN ELECTRIC DRIVE MOTOR

(75) Inventor: Detlef Zur Megede, Kirchheim/Teck (DE)

(73) Assignee: XCELLSIS GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/536,294

(22) Filed: Mar. 27, 2000

(30) Foreign Application Priority Data

Mar. 26, 1999 (DE) ............................................. 199 13 794

(51) Int. Cl.[7] ............................. B60K 11/04; B60K 1/00
(52) U.S. Cl. ........................................ 180/65.2; 180/69.5
(58) Field of Search .................................. 180/65.1, 65.2, 180/65.3, 65.6, 65.8, 69.4, 69.5, 68.4, 165; 123/1 A, 3, 41.3, 288, 557, 558, DIG. 12

(56) References Cited

U.S. PATENT DOCUMENTS

| 4,226,294 | * | 10/1980 | Latter et al. ......................... 180/69.5 |
| 4,271,664 | * | 6/1981 | Earnest ............................... 60/39.181 |
| 4,583,512 | * | 4/1986 | Gardner et al. ...................... 123/557 |
| 5,200,278 | * | 4/1993 | Watkins et al. ...................... 429/24 |
| 5,228,529 | * | 7/1993 | Rosner ................................ 180/65.3 |
| 5,316,870 | * | 5/1994 | Ohga ................................... 429/24 |
| 5,366,821 | * | 11/1994 | Merritt et al. ....................... 429/21 |
| 5,605,770 | * | 2/1997 | Andreoli et al. ..................... 429/20 |
| 5,662,184 | * | 9/1997 | Riemer et al. ....................... 180/65.1 |
| 5,991,670 | * | 11/1999 | Mufford et al. ...................... 701/22 |
| 6,053,266 | * | 4/2000 | Greenhill et al. .................... 180/65.3 |
| 6,186,254 | * | 2/2001 | Mufford et al. ..................... 180/65.3 |

FOREIGN PATENT DOCUMENTS

| 44 12 451 C1 | 4/1994 | (DE) . |
| 1 447 835 | 9/1976 | (GB) . |
| WO 98/40922 | 9/1998 | (WO) . |

* cited by examiner

Primary Examiner—Brian L. Johnson
Assistant Examiner—Bridget Avery
(74) Attorney, Agent, or Firm—Crowell & Moring, L.L.P.

(57) ABSTRACT

A vehicle has an internal-combustion engine drive and a fuel cell drive system. Liquid fuel is used to supply energy to the internal-combustion engine drive and the fuel cell system. The internal-combustion engine drive is used for starting the vehicle and for permitting its immediate movement after starting of the internal-combustion engine, as well as for heating the fuel cell system to a working temperature. After the working temperature is reached, the fuel cell is started. Subsequently, an electric driving motor, which is fed by the fuel cell system, alone or together with the internal-combustion engine drive, drives the movement of the vehicle.

20 Claims, 3 Drawing Sheets

HYBRID VEHICLE HAVING A AN INTERNAL-COMBUSTION ENGINE, A FUEL CELL SYSTEM AND AN ELECTRIC DRIVE MOTOR

BACKGROUND AND SUMMARY OF THE INVENTION

This application claims the priority of German patent document 199 13 794.3, filed Mar. 26, 1999.

The invention relates to a vehicle having a transmission line for at least two driving wheels, an internal-combustion engine drive and a fuel cell system drive.

A known hybrid drive for a vehicle disclosed in British Patent Document GB 1447 835 consists of an internal-combustion engine drive and a fuel cell system drive. The fuel cell system drive contains an electric motor whose shaft is connected at one end with the drive shaft of the internal-combustion engine and at the other end with a clutch. The clutch is followed by a transmission line having a transmission, a cardan shaft, a differential gear, wheel shafts and driving wheels. The internal-combustion engine and the fuel cell are supplied with hydrogen by a common fuel source, by way of respective supply lines. Each supply line has a control valve connected to an electric control system which is mechanically connected with a foot pedal; the position of the foot pedal controls the operation of the two control valves in the supply lines. For pedal positions assigned to lower driving powers for the vehicle, the control system opens up the control valve in the supply line for the internal-combustion engine, while for pedal positions assigned to higher driving powers, the control system opens up the control valves in both supply lines for the internal-combustion engine and the fuel cell.

So that the fuel cell will be able to provide power without any interruption, an additional control unit allows the internal-combustion engine to operate at a low power output for the vehicle in the idling mode, while the fuel cell emits power. In the case of a higher power demand, both drives operate together. In the idling mode, sufficient fuel is fed to the internal-combustion engine that it does not act as a brake for the electric motor which generates the driving power.

Another known vehicle has an electric motor, a fuel cell, a compressor for feeding air to the fuel cell, an electric motor for driving the compressor, a reformer, a fuel tank for liquid fuel, a water tank and an evaporator. The liquid fuel and the water are changed in the evaporator into the gaseous state and are then guided to the reformer. There, while heat is supplied, by means of a catalytic burner, hydrogen, carbon dioxide and carbon monoxide are formed. The hydrogen-containing gas thus formed is fed to the fuel cell together with pressurized air (See German Patent Document DE 44 12 451 01).

Fuel cell systems which include a gas generator for generating hydrogen from a liquid fuel, have a number of disadvantages in comparison to fuel cell systems which are fed from tanks with gaseous hydrogen. Elimination of these disadvantages requires significant additional expenditures, and is not completely successful.

In this context, mainly cold starting behavior is problematic. Since the gas generating system becomes operable (that is, it generates hydrogen containing gas) only after a defined higher operating temperature is reached (depending on the type of fuel), it must first be heated after the vehicle is started. This results in a waiting time between the vehicle start and its readiness to be operated. Moreover, the generation of thermal energy to heating up of the gas generating system consumes fuel while the vehicle is idle.

In order to avoid the above-mentioned disadvantages, either an additional storage unit must be provided, or a process for generating hydrogen without high temperatures (that is, at ambient temperature), can be used. A suitable hydrogen generating process which operates at an ambient temperature, however, is not known.

The storage unit, which may consist, for example, of an electric battery, a supercondenser or an additional hydrogen tank, must have a sufficient charge or filling before the start of the operation. However, after longer stoppage times, this may no longer be the case. In the case of a hydrogen generating process which also operates at low temperatures, the expenditures are increased.

One object of the invention is to provide a fuel cell system fed with liquid fuel, and a process for operating a vehicle, which permit the vehicle to start to drive immediately, without any energy removal from an additional gas accumulator for the fuel cell.

This and other objects and advantages are achieved by the vehicle according to the invention, which has at least one transmission line for driving the vehicle wheels, together with an internal-combustion engine drive which can be coupled to the transmission line, and a fuel cell system which includes a gas generating device for generating a hydrogen-containing gas from a fuel for the fuel cell, at higher temperatures. Devices are also provided for transmitting heat from the internal-combustion engine drive into the gas generating device and into the fuel cell, as well as a control system, by which assemblies for feeding fuel and air to the fuel cell system (after the gas generating device is heated up) and to the fuel cell, can automatically be switched to working temperatures. The transmission line consists of those components which are situated between the vehicle's clutch and its driving wheels.

The internal-combustion engine drive in this case is a drive with a conventional internal-combustion engine, together with assemblies required for driving, such as the starter, the generator, the accumulator, the fuel distributor, the ignition device, etc. The internal-combustion engine drive is started conventionally, by means of an ignition key which actuates the components for starting.

Hot exhaust gases generated during operation of the internal-combustion engine heat the gas generating device and the fuel cell to operating temperatures (or to a temperature sufficient for their operation). As soon as the working or operating temperature has been reached, the supply of air and liquid fuel to the gas generating device is initiated, and the fuel cell is started with the air and the hydrogen-containing gas emitted by the gas generating device.

The vehicle also includes at least one electric driving motor which is controlled, for example, by way of an actuator, and can be coupled to the transmission line by way of a clutch, when the fuel cell generates current. Depending on the required driving power, the internal-combustion engine may cooperate with the electric driving motor, or may be uncoupled from the transmission line. Liquid fuel is preferably provided to supply energy to the internal-combustion engine drive, and to the fuel cell system.

The system according to the invention permits a vehicle which uses liquid fuel for a fuel cell system drive, to be ready to drive immediately. Thus, waiting times during the start of the operation with a cooled gas generating system can be avoided. Additional advantages of the system according to the invention are: No additional fuel requirement for heating the fuel cell system before starting to drive; increased operational reliability in that the vehicle is able to continue to drive, by means of the internal-combustion engine, in the event of a disturbance of the fuel cell system; and flexible utilization of the internal-combustion engine and the fuel cell system drive according to the requirement for additional or alternative driving power, additional current supply, etc.

It is advantageous if, after the fuel cell starts to operate, the electric driving motor can automatically be coupled to the transmission line, or if such coupling, which is to be carried out manually or by a foot pedal, can be released. As soon as the internal-combustion engine is started, its clutch connection with the transmission line and the driving wheels can be activated, whereupon the vehicle will start to move.

In an expedient embodiment, the nominal capacity of the internal-combustion engine drive is lower than that of the electric driving motor. The internal-combustion engine is required particularly for starting the vehicle when the gas generating system is cold, and for heating-up the gas generating system to the operating temperature. The power required for this purpose is low compared to that which is necessary for the various speeds, load conditions and slopes in the normal driving operation.

In particular, the internal-combustion engine drive and the fuel cell system are jointly connected to a radiator in a cooling circulating system. A joint radiator reduces the expenditures for the driving systems. In addition, before the start of its operation, the fuel cell is already heated by the internal-combustion engine to the working or operating temperature. This also saves weight at the vehicle. Another advantage is the fact that, by way of its cooling circulating system, the internal-combustion engine, has a higher temperature when it is not in operation, so that a required start of its operation for assisting the electric driving motor takes place at a higher operating temperature. As a result, the generation of pollutants (which is higher just after a start in the case of a cold internal-combustion engine) is avoided.

In another expedient embodiment, a device is provided for transmitting heat from the exhaust gases of the internal-combustion engine into the gas generating device. In particular, a bypass is arranged which extends outside the gas generating device; during the operation of the internal-combustion engine and during the operation of the fuel cell system, the bypass allows the exhaust gases to pass through, but blocks them before the start of the operation of the fuel cell system. When the fuel cell system is operating (that is, generating current), heat is created which is sufficient for the operation of the gas generating system. In order to avoid overheating during a simultaneous power output of the fuel cell and of the internal combustion engine, the exhaust gases of the internal-combustion engine will then be guided past the gas generating system.

It is advantageous for a device for transmitting heat from the exhaust gases of the internal-combustion engine to consist of at least one line which extends in the interior of the gas generating system and carries exhaust gases. This embodiment is distinguished by its simple construction.

In another advantageous embodiment, the internal-combustion engine, the gas generating device and the fuel cell are jointly connected to an exhaust gas purification system. This embodiment permits the construction of a lower-weight driving system.

The process according to the invention provides for operation of a vehicle having at least one transmission line for driving wheels and an internal-combustion engine drive which can be coupled to the transmission line, as well as having a fuel cell system with a gas generating device that generates hydrogen-containing gas for the fuel cell at higher temperatures. According to the invention, the internal-combustion engine drive is operated with liquid fuel. After starting of the internal-combustion engine, it can be coupled to the transmission line, while its hot exhaust gases heat the fuel cell system directly and/or indirectly to a temperature sufficient at least for the operation. When this temperature is reached, the fuel cell system drive is started by the feeding of fuel and air. An electric driving motor is coupled, either automatically, by foot or manual operation to the transmission line, and the internal-combustion engine is optionally uncoupled from the transmission line.

Expediently, the fuel cell and the internal-combustion engine are jointly cooled to an operating temperature, and the internal-combustion engine will thus be maintained at its operating temperature even when it is not operating. Therefore, when the internal-combustion engine is connected to augment the power of the vehicle drive, there is no high pollutant emission such as occurs in the case of a cold start.

Other objects, advantages and novel features of the present invention will become apparent from the following detailed description of the invention when considered in conjunction with the accompanying drawings.

DETAILED DESCRIPTION OF THE DRAWINGS

Figure 1:
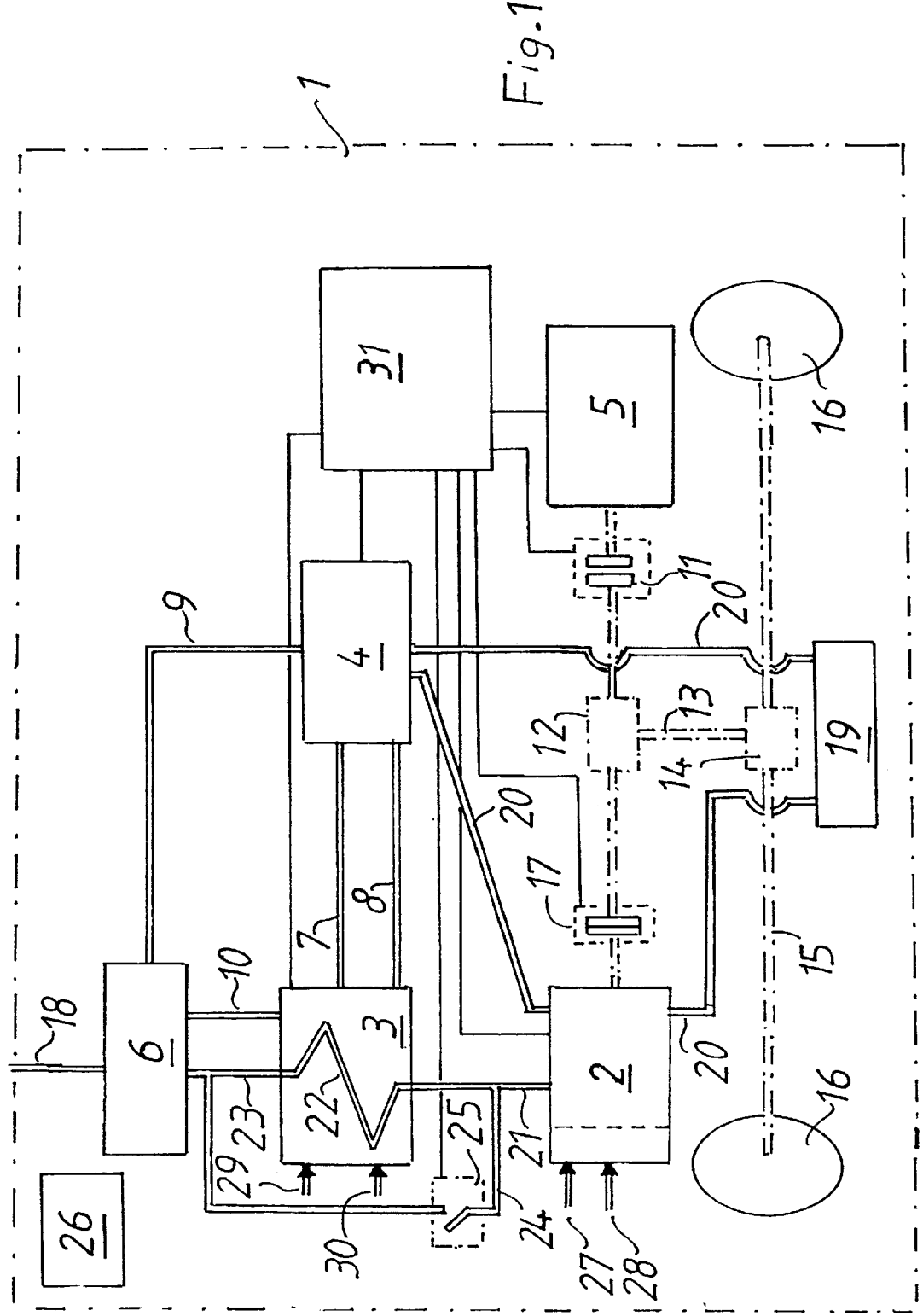
FIG. 1 is a basic diagram of a vehicle having both an internal-combustion engine drive and a fuel cell system drive, in a first operating condition.

Referring to FIG. 1, a vehicle, which as a whole has the reference number 1 has an internal-combustion engine drive with an internal-combustion engine 2 which contains all additional assemblies required for its operation, such as a starter, a generator, an accumulator, a fuel distributor, an ignition device, a voltage regulator, etc., which are not shown in detail. In the following, the internal-combustion engine driving system will also be called internal-combustion engine 2.

In addition, the vehicle 1 has a fuel cell system drive having a construction that is known per se, of which the gas generating device 3, the fuel cell 4, the electric driving motor 5 and an exhaust gas purification unit 6 are shown. From the gas generating device 3, a connection line 7 supplies hydrogen-containing gas to the fuel cell 4, while reaction air is supplied by a line 8. From the fuel cell 4, a line 9 for the removal of residual air or of exhaust gases leads to the exhaust gas purification unit 6. An exhaust pipe 10 connects the gas generating device 3 with the exhaust gas purification unit 6, to which the vehicle exhaust 18 is connected.

By way of a clutch 11 and a differential gear 12, the electric driving motor 12 is connected with the cardan shaft 13 which, by way of another differential gear 14, drives the axle 15 with the wheels 16. The internal-combustion engine 2 is connected with the differential gear 12 by way of a clutch 17.

The internal-combustion engine 2 and the fuel cell 4 have a common cooling circulating system with a radiator 19. The fuel cell 4 is particularly an $H_2/O_2$ fuel cell with a proton-conducting membrane (a so-called PEM cell) and is composed of a stack of individual fuel cells. In addition to the radiator 19, the drawing illustrates the lines 20 between the internal-combustion engine 2 and the radiator 19, between the internal-combustion engine 2 and the fuel cell 4 and between the fuel cell 4 and the radiator 19.

From the internal-combustion engine 2, an exhaust pipe 21 extends to the gas generating device 3, in which the exhaust pipe is guided through, for example, in the shape of a heating coil 22. From the heating coil 22, an exhaust pipe 23 extends between the gas generating device 3 and the exhaust gas purification unit 6. A bypass line 24 branches off the exhaust pipe 21, by means of which bypass line 24 the gas generating device 3 is bypassed. A shut-off element 25, such as a flap, a valve or a slide, is arranged in the bypass line 24.

The vehicle 1 has a fuel tank 26 in which, for example, liquid methanol is situated. The fuel in the tank 26 is used for supplying the internal-combustion engine 2 as well as for supplying the fuel cell 4. The fuel line to the internal-combustion engine 2 is not illustrated in the drawing. An inlet 27 for air and an inlet 28 for the fuel are schematically illustrated on the internal-combustion engine 2, which are arranged, for example, in a conventional mixture formation device which is not described in detail and is part of the internal-combustion engine 2.

The fuel is fed to the gas generating device 3 by way of a line not shown in detail at a schematically illustrated inlet 29. Air is fed to the gas generating device 3 by way of a schematically illustrated inlet 30. In the gas generating device 3, the hydrogen required by the fuel cell 4 is separated from the fuel. The gas generating device 3 has, for example, an evaporator (known per se), in which the fuel and water from a water storage device (not shown) are converted to a gaseous condition and are then guided to a reformer. By means of a catalytic burner, a hydrogen-containing gas is formed in the reformer, from which residual gas is separated which is removed by way of the exhaust pipe 10. The hydrogen-containing gas and air are fed under pressure to the fuel cell 4, in which the electric energy is generated which is required for the operation of the electric driving motor 5.

A control system 31, which, among other devices, contains an actuator for the electric driving motor 5, is connected by way of lines (shown schematically) with the electric driving motor 5, the electric assemblies of the internal-combustion engine 2, at least one temperature sensor in the gas generating device 3, the fuel cell 4, the shut-off element 25, the clutch 17 and the clutch 11.

The internal-combustion engine 2 has a driving power of, for example, 30 kW, while the electric driving motor 5 has a driving power of 70 kW. (Other power ratios are of course also possible.) The heat required for heating the gas generating device 3 from the cold condition to its operating temperature can be obtained from the exhaust gases of the internal-combustion engine 2, by means of a heat exchanger which causes a heat transfer medium other than the exhaust gases to circulate in the gas generating device 3.

By the turning an ignition key (not shown) in an ignition lock connected with the control system 31, the internal-combustion engine 2 is started in a conventional manner, after which the vehicle is ready to drive. By the engaging a first gear (not shown) and the operation of the clutch 17 by means of the control system 31, the vehicle 1 starts to move. (In this case the clutch 11 is not operated.) The shut-off element 25 shuts off the bypass line 24. The internal-combustion engine 2 drives the wheels 16 by way of the differential gear 12, the cardan shaft 13, the differential gear 14 and the axle 15. The above-described condition of the vehicle 1 is illustrated in FIG. 1.

In the idling mode of the internal-combustion engine 2, and particularly during driving with a corresponding power output, the exhaust gases of the internal-combustion engine 2 heat the gas generating device 3. After passing through the heating coil 22, the exhaust gases of the internal-combustion engine 2 arrive by way of the exhaust pipe 23 in the exhaust gas purification unit 6 and, from there, by way of the exhaust 18 into the open air. As the result of the circulation of the cooling liquid, which is also guided through the fuel cell 4, in the radiator, the internal-combustion engine 2 is maintained at a temperature value which is advantageous for operation. In this case, the fuel cell 4 is also heated to, for example, 800° C. to 900° C.

Figure 2:
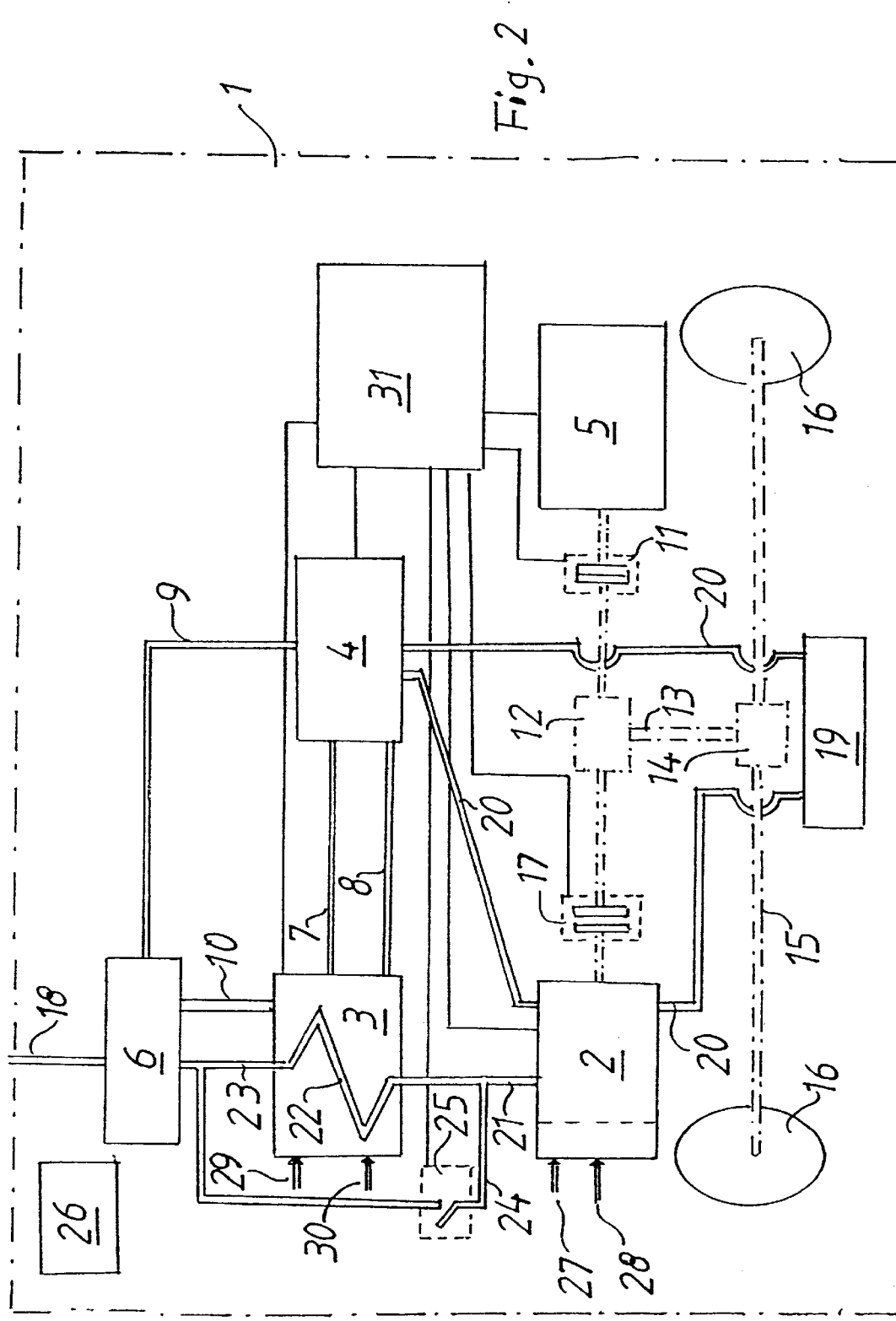
FIG. 2 is a view of the vehicle illustrated in FIG. 1 in a second operating condition.

The control system 31 monitors the temperature in the gas generating device 3, and automatically starts its operation when it has reached its operating temperature, by causing air and fuel to be fed to it. For the supply of air and fuel, for example, compressors (not shown) are fed by the accumulator and the generator of the internal-combustion engine 2. Because, at this point in time, the gas generating device 3 and the fuel cell 4 have already reached their operating temperatures, current is generated by the fuel cell 4 within a few seconds, and both the fuel cell system and the electric driving motor 5 are supplied with current. The control system 31 operates the clutch 11, opens the clutch 17 and switches off the internal-combustion engine 2, so that the vehicle 1 is now driven by the electric driving motor 5. In this case, the bypass line 24 continues to be shut off. The gas generating device 3 itself generates the heat required for its operation. The above-described operating condition is illustrated in FIG. 2 and can be recognized by means of the positions of the clutches 11, 12.

Since the internal-combustion engine 2 continues to be heated by the waste heat of the fuel cell 2, it can be switched on again for increasing power as required, in which case the clutch 17 is closed again.

Figure 3:
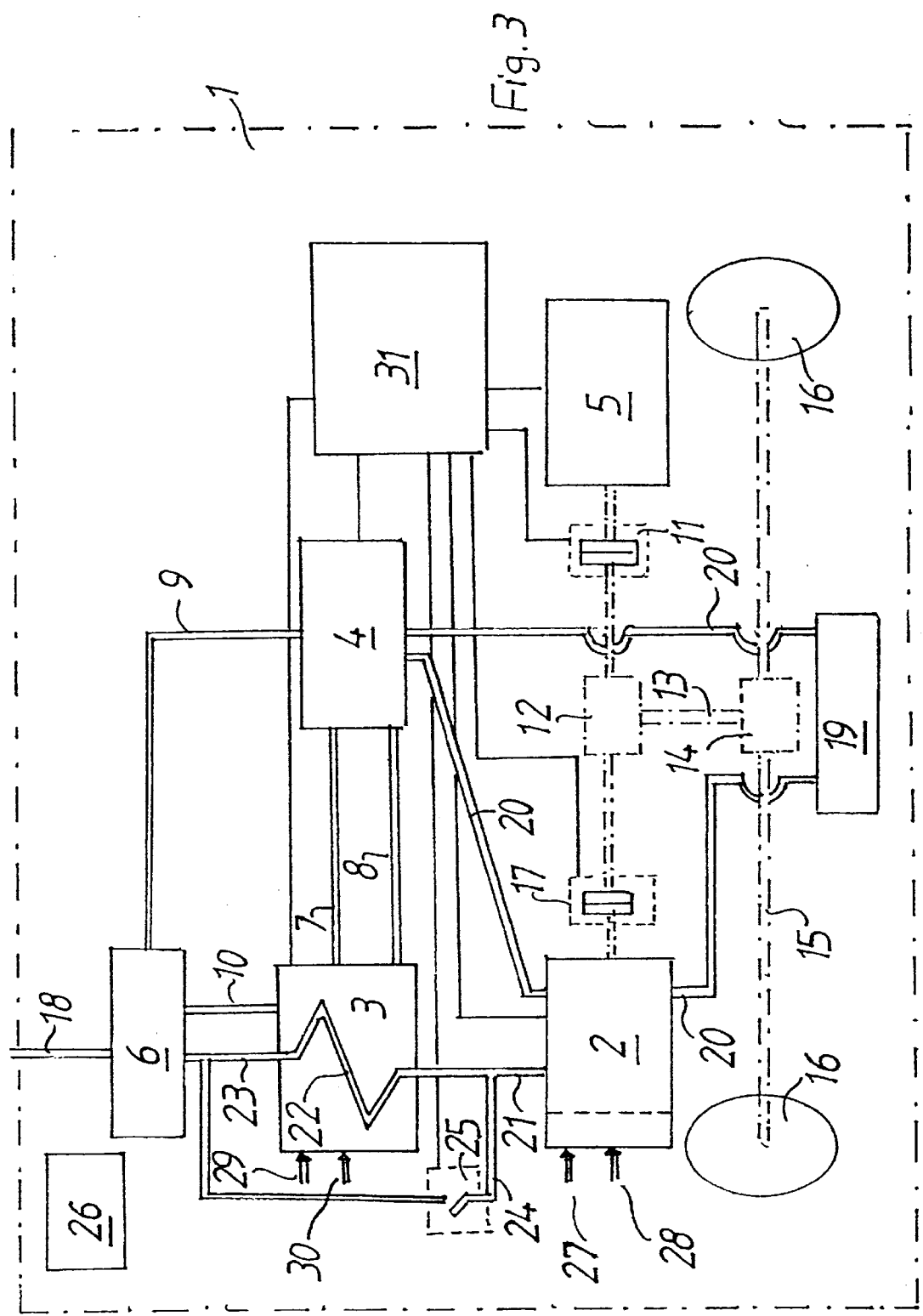
FIG. 3 is a view of the vehicle illustrated in FIG. 1 in a third operating condition.

The vehicle 1 will then be driven by the internal-combustion engine 2 and the electric driving motor 5. In this operating mode illustrated in FIG. 3, the bypass line 24 is not shut off, whereby an undesirably high heating of the gas generating device 3 is avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle drive system, comprising:
   at least one drive transmission line for driving wheels of the vehicle;
   an internal-combustion engine drive which can be coupled selectively to the transmission line;
   a fuel cell system drive which includes a fuel cell and a gas generating device which, at a working temperature, generates hydrogen-containing gas for the fuel cell from a fuel;
   devices for transmitting heat from the internal-combustion engine drive into the gas generating device and the fuel cell;
   assemblies for controlling a feed of fuel and air to the fuel cell system drive; and a control system for automatically switching said assemblies to a mode for the working temperature, after the heating of the gas generating device and the fuel cell.

2. The vehicle drive system according to claim 1, wherein the fuel cell system further comprises at least one electric driving motor which can be coupled selectively to the transmission line.

3. The vehicle drive system according to claim 1, wherein liquid fuel is provided for the energy supply of the internal-combustion engine drive and of the fuel cell system.

4. The vehicle drive system according to claim 2, wherein after the fuel cell has started to operate, the electric driving motor can automatically be coupled to the transmission line, or coupling of the electric driving motor with the transmission line either manually or by means of a foot pedal, can be enabled.

5. The vehicle drive system according to claim 2, wherein a nominal capacity of the internal-combustion engine drive is lower than a nominal capacity of the electric driving motor.

6. The vehicle drive system according to claim 2, wherein the internal-combustion engine and the fuel cell system drive are jointly connected to a radiator by a cooling circulating system.

7. The vehicle drive system according to claim 1, further comprising a device for transmitting heat from the exhaust gases of the internal-combustion engine drive into the gas generating device.

8. The vehicle drive system according to claim 7, wherein the device for transmitting heat is a pipe for exhaust gas return, which pipe extends into the interior of the gas generating device.

9. The vehicle drive system according to claim 1, further comprising:
a bypass arranged in parallel to the device for transmitting heat from the exhaust gases of the internal-combustion engine drive into the gas generating device which bypass extends outside the gas generating device and which has a shut-off element which can be operated by the control system.

10. The vehicle drive system according to claim 1, wherein the internal-combustion engine drive and the fuel cell system drive are connected to a joint exhaust gas purification system.

11. A process for operating a vehicle having at least one drive transmission line, an internal-combustion engine drive which can be coupled to the transmission line, and a fuel cell system drive which has a fuel cell and a gas generating device which, at a working temperature, generates hydrogen-containing gas for the fuel cell from a liquid fuel, the internal-combustion engine drive being operated with liquid fuel, said process comprising:
starting the internal combustion engine drive;
after starting the internal-combustion engine drive, coupling the internal combustion engine drive to the transmission line for movement of the vehicle;
using hot exhaust gases generated by the internal-combustion engine drive directly or indirectly to heat the fuel cell system drive to said working temperature; and
when the working temperature is reached, starting the fuel cell system drive by feeding of fuel and air.

12. The process according to claim 11, wherein the fuel cell system drive has an electric driving motor which can be coupled to the transmission line, and further comprising:
after the working temperature of the fuel cell system drive has been reached, automatically coupling the electric drive motor to the transmission line or enabling coupling the electric driving motor to the transmission line by foot operation or manual operation, while the internal-combustion engine drive is optionally uncoupled from the transmission line.

13. The process according to claim 11, wherein the internal-combustion engine drive and the fuel cell system drive act jointly upon the transmission line.

14. The process according to claim 11, wherein after the fuel cell starts to operate, the fuel cell system drive acts solely upon the transmission line.

15. The process according to claim 11, wherein temperatures of the fuel cell and of the internal-combustion engine drive are jointly regulated to a working temperature.

16. The process according to claim 11, further comprising a bypass arranged in parallel to the device for generating gas, for the transmission of the heat outside the gas generating device, wherein:
the bypass is blocked when the internal-combustion engine drive is operating, and the fuel cell is not operating, and also when the fuel cell is operating and the internal-combustion engine drive is not operating; and
the bypass is unblocked when the internal-combustion engine drive and the fuel cell operate simultaneously.

17. A vehicle drive system comprising:
a fuel supply;
a vehicle drive train for transmitting driving power to wheels of the vehicle;
an internal combustion engine which is fueled by fuel from the fuel supply, and which is selectively connectable to provide driving power to the drive train;
an electric motor which is selectively connectable to provide driving power to the drive train;
a fuel cell system for providing electric power to the electric motor, and including a reformer for generating hydrogen gas to a fuel cell when the fuel cell system is at an operating temperature;
at least one heat transfer path for transferring heat between said internal combustion engine drive and said fuel cell system; and
a control unit for controlling a flow of heat between said internal combustion engine and said fuel cell system via said at least one heat transfer path.

18. A vehicle drive system according to claim 17, wherein said control unit causes said internal combustion engine drive to be coupled to drive the vehicle wheels when the vehicle is first started, while heat flows from said internal combustion engine drive to said fuel cell system until said fuel cell system reaches said operating temperature, and thereafter couples the electric motor to drive the vehicle wheels.

19. A vehicle drive system according to claim 18, wherein after the fuel cell system reaches the operating temperature, the controls system uncouples said internal combustion engine drive from said drive train and causes heat to flow from the fuel cell system to the internal combustion engine drive system, maintaining it at a working temperature.

20. A vehicle drive system according to claim 19, wherein said control unit reconnects said internal combustion engine drive to said drive train whenever, a power demand of said vehicle exceeds a maximum capacity of said electric motor.

* * * * *